US012812752B2

(12) United States Patent
Ostojic et al.

(10) Patent No.: US 12,812,752 B2
(45) Date of Patent: Nov. 24, 2026

(54) DETERMINING LIGHT EFFECTS BASED ON AUDIO RENDERING CAPABILITIES

(71) Applicant: SIGNIFY HOLDING B.V., Eindhoven (NL)

(72) Inventors: Aleksandar Ostojic, Eindhoven (NL); Dzmitry Viktorovich Aliakseyeu, Eindhoven (NL); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 67 days.

(21) Appl. No.: 18/730,422

(22) PCT Filed: Jan. 17, 2023

(86) PCT No.: PCT/EP2023/050945
§ 371 (c)(1),
(2) Date: Jul. 19, 2024

(87) PCT Pub. No.: WO2023/139044
PCT Pub. Date: Jul. 27, 2023

(65) Prior Publication Data

US 2025/0106966 A1 Mar. 27, 2025

(30) Foreign Application Priority Data

Jan. 21, 2022 (EP) .................................... 22152593

(51) Int. Cl.
*H05B 47/105* (2020.01)
*H04R 5/04* (2006.01)
(Continued)

(52) U.S. Cl.
CPC ............ *H05B 47/105* (2020.01); *H04R 5/04* (2013.01); *H04S 3/008* (2013.01); *H04S 7/307* (2013.01); *H04S 2400/01* (2013.01)

(58) Field of Classification Search
CPC .......... H04R 5/04; H05B 45/20; H05B 47/12; H05B 47/105; H05B 47/155; H05B 47/165; H04S 3/008; H04S 7/307; H04S 2400/01
See application file for complete search history.

(56) References Cited

U.S. PATENT DOCUMENTS 12,035,431 B2 * 7/2024 Cremer .................. F21S 10/02
2007/0008711 A1 * 1/2007 Kim ........................ A63J 17/00 362/86

(Continued)

FOREIGN PATENT DOCUMENTS

| | | | |
|---|---|---|---|
| KR | 20200034159 | A | 3/2020 |
| WO | 2020089150 | A1 | 5/2020 |
| WO | 2020144265 | A1 | 7/2020 |

*Primary Examiner* — Paul W Huber

(57) ABSTRACT

A system for controlling one or more lighting devices (11-15) to render light effects while an audio rendering system (31, 34-39) renders audio content (81) is configured to obtain information indicative of audio rendering capabilities of the audio rendering system, obtain audio characteristics (83-88) of the audio content, select a subset of the audio characteristics based on the audio rendering capabilities of the audio rendering system, determine light effects based on the subset of the audio characteristics, and control the one or more lighting devices to render the light effects.

18 Claims, 6 Drawing Sheets

(51) Int. Cl.
*H04S 3/00* (2006.01)
*H04S 7/00* (2006.01)

(56) References Cited

U.S. PATENT DOCUMENTS

| | | | | |
|---|---|---|---|---|
| 2015/0282282 | A1* | 10/2015 | Breuer | H05B 47/12<br>315/152 |
| 2018/0098151 | A1* | 4/2018 | Penke | H04R 3/12 |
| 2019/0069375 | A1* | 2/2019 | Baker | H04N 21/4131 |
| 2019/0166674 | A1 | 5/2019 | Mason et al. | |
| 2020/0275152 | A1* | 8/2020 | Rycroft | H04N 21/44008 |
| 2021/0235192 | A1 | 7/2021 | Healy et al. | |
| 2021/0318847 | A1* | 10/2021 | Sullivan | G06F 3/165 |
| 2022/0053618 | A1 | 2/2022 | Borra et al. | |

* cited by examiner

DETERMINING LIGHT EFFECTS BASED ON AUDIO RENDERING CAPABILITIES

CROSS-REFERENCE TO PRIOR APPLICATIONS

This application is the U.S. National Phase application under 35 U.S.C. § 371 of International Application No. PCT/EP2023/050945, filed on Jan. 17, 2023, which claims the benefit of European Patent Application No. 22152593.4, filed on Jan. 21, 2022. These applications are hereby incorporated by reference herein.

FIELD OF THE INVENTION

The invention relates to a system for controlling one or more lighting devices to render light effects while an audio rendering system renders audio content.

The invention further relates to a method of controlling one or more lighting devices to render light effects while an audio rendering system renders audio content.

The invention also relates to a computer program product enabling a computer system to perform such a method.

BACKGROUND OF THE INVENTION

To create a more immersive experience for a user who is listening to a song being played by an audio rendering device, a lighting device can be controlled to render light effects while the audio rendering device plays the song. In this way, the user can create an experience at home which somewhat resembles the experience of a club or concert, at least in terms of lighting. To create an immersive light experience, the accompanying light effects should match the music in terms of e.g. color, intensity, and/or dynamics. The light effects may be synchronized to the bars and/or beats of the music or even to the rhythm of the music, for example.

When light effects are created for accompanying on-screen content, the colors for light effects are usually taken directly from the content that is played on the screen, as described in WO 2020/089150 A1, for example. The light output level (sometimes also referred to as brightness) at which the light effects are rendered may be user-configurable, for example.

US2022/053618 A1 uses information indicating a degree of speech in the audio portion of media content. An extent to which the audio portion should be used to render the light effects is determined.

When light effects are created for accompanying songs, light effects need to be determined in a different way than when light effects are created for accompanying on-screen content. But also in this case, it is important that there is a good match between rendered content and rendered light effects.

SUMMARY OF THE INVENTION

It is a first object of the invention to provide a system, which is able to control one or more lighting devices to render light effects which match well with rendered audio.

It is a second object of the invention to provide a method, which can be used to control one or more lighting devices to render light effects which match well with rendered audio.

In a first aspect of the invention, a system for controlling one or more lighting devices to render light effects while an audio rendering system renders audio content comprises at least one input interface, at least one transmitter, and at least one processor configured to obtain, via said at least one input interface, information indicative of a type of said audio rendering system and/or of one or more types of one or more audio rendering devices comprised in said audio rendering system, determine audio rendering capabilities of said audio rendering system, based on said type of said audio rendering system and/or based on said one or more types of said one or more audio rendering devices, obtain audio characteristics of said audio content, select one or more subsets of said audio characteristics based on said audio rendering capabilities of said audio rendering system, determine light effects based on said subsets of said audio characteristics, and control, via said at least one transmitter, said one or more lighting devices to render said light effects.

By taking into account the audio rendering capabilities of the user's audio rendering system and determining light effects based on audio characteristics rendered by the user's audio rendering system and therefore not based on audio characteristics not rendered by the user's audio rendering system, a better match between the rendered light effects and the rendered audio may be obtained. For example, if the audio rendering system comprises a subwoofer, light effects related to lower frequencies may be intensified, and if the audio rendering system does not comprise a subwoofer, light effects relating to lower frequencies may be omitted or lessened. Some or all of the audio characteristics may be determined by locally analyzing the audio content, for example. Some or all of the audio characteristics may be received from a music streaming service, for example. The audio content may be a song, for example.

If the audio rendering system comprises only a smart speaker like an Amazon Echo speaker, it may be determined that only a relatively small number of audio channels can be rendered and/or that very low frequencies cannot be reproduced. If the audio rendering system comprises an AV receiver and at least six (5.1) speakers, it may be determined that a relatively large number of audio channels can be rendered and/or that very low frequencies can be reproduced.

Said at least one processor may be configured to determine events in said audio content, said events corresponding to moments in said audio content when said audio characteristics meet predefined requirements, and determine a light effect for each respective event of said events by determining an intensity of said light effect based on a match between said audio rendering capabilities and one or more of said subsets of said audio characteristics, said one or more audio characteristics relating to said respective event. Said intensity may comprise brightness, contrast, color saturation and/or dynamicity level, for example.

These audio events are the moments in the audio content for which it is beneficial to render an accompanying light effect. The predefined requirements express when it is beneficial to render an accompanying light effect. The predefined requirements may require that the audio intensity/loudness exceeds a certain threshold, for example. In this case, the determined audio events are the moments at which the audio intensity/loudness exceeds the threshold. These audio events may be determined based on data points received from a music streaming service, for example.

Said at least one processor may be configured to determine said events based on said one or more subsets of said audio characteristics. In this case, light effects are only rendered for audio events that occur in the subsets of audio characteristics. When the audio events are alternatively determined based on all audio characteristics, audio events may be determined that would not be determined based on only the subset of audio characteristics, i.e. audio events that do not (just) occur in the subset of audio characteristics. Light effects with a lower intensity, e.g. a lower brightness, may be rendered for these audio events. Thus, the light effects would still be determined based on the subset of the audio characteristics even if the audio events themselves are not.

Events may not only be determined based on audio characteristics but may also be specified in a light script. For example, a light script may specify that light effects are to be rendered at certain moments (corresponding to events) and the light settings associated with these moments may then for example be adjusted based on the subset of the audio characteristics, e.g. depending on whether an instrument can be reproduced (well) by the audio rendering system is played at that moment in the audio content.

Said at least one processor may be configured to determine a matching level between said audio rendering capabilities and said one or more audio characteristics, determine whether said matching level exceeds a threshold, and select a contrasting light effect as said light effect if said matching level is determined to exceed said threshold. The contrasting light effect may be a bright white light effect, for example. This results in the most intense light effects.

Said at least one processor may be configured to determine events in said audio content based on said audio rendering capabilities, said events corresponding to moments in said audio content when said one or more subsets of said audio characteristics meet predefined requirements, and determine said light effects for said events, based on said one or more subsets of said audio characteristics. In this case, light effects are only rendered for audio events that occur in the subset of audio characteristics. A threshold may be used to determine whether said subset of said audio characteristics meet said predefined requirements.

Events may be determined based on said audio rendering capabilities in various manners. Before the final events are determined, initial events may first be determined based on all audio characteristics and a subset of these events may then be selected based on the audio rendering capabilities. For example, if there are two consecutive initial events, one of these initial events may be chosen as final event based on the audio rendering capabilities. Audio processing may be performed to extract instrument and voice information and an initial event may be selected as final event depending on whether the initial event involves an instrument which can be reproduced (well) by the audio rendering system.

Said at least one processor may be configured to determine an intensity of said light effects based on said subset of said audio characteristics. Alternatively, the one or more components of the intensity of the light effects may be fixed and/or depend on audio characteristics not in the subset.

Said audio rendering capabilities may comprise a capability of reproducing different frequencies. In a first implementation, said at least one processor may be configured to select one or more frequency bands based on said capability of reproducing different frequencies and select said one or more subsets of said audio characteristics based on said selected one or more frequency bands of said audio content. For example, Fourier frequency analysis may be used to determine at which moments the power in the frequency bands that the audio rendering system is able to reproduce exceeds a threshold.

In a second implementation, said at least one processor may be configured to select one or more key frequencies based on said capability of reproducing different frequencies, determine events in said audio content which are associated with a key frequency of said one or more key frequencies, and select said one or more subsets of said audio characteristics by selecting audio characteristics associated with said events. For example, data points received from a music streaming service may comprise both an audio intensity/loudness and a key frequency per data point. A data point may be determined to correspond to an audio event if the associated key frequency can be reproduced and the audio intensity/loudness exceeds a threshold, for example.

Said audio rendering capabilities may comprise a capability of reproducing surround sound and/or may be indicative of a number of audio channels. For example, said at least one processor may be configured to select one or more audio source positions based on said capability of reproducing surround sound and/or said number of audio channels, select one or more audio channels and/or audio objects of said audio content based on said one or more audio source positions, and select said one or more subsets of said audio characteristics based on said selected one or more audio channels and/or audio objects. For example, depending on whether an audio rendering system is capable of reproducing the frequencies of a Low Frequency Effects (LFE) channel, audio events, e.g. corresponding to explosions, may be detected in the LFE channels. Surround sound may be reproduced with additional speakers (e.g. surround speakers) and/or by using techniques that can virtualize the surround sound listening environment (to a certain degree).

In a second aspect of the invention, a method of controlling one or more lighting devices to render light effects while an audio rendering system renders audio content comprises obtaining information indicative of a type of said audio rendering system and/or of one or more types of one or more audio rendering devices comprised in said audio rendering system, determining audio rendering capabilities of said audio rendering system, based on said type of said audio rendering system and/or based on said one or more types of said one or more audio rendering devices, obtaining audio characteristics of said audio content, selecting a subset of said audio characteristics based on said audio rendering capabilities of said audio rendering system, determining light effects based on said subset of said audio characteristics, and controlling said one or more lighting devices to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more lighting devices to render light effects while an audio rendering system renders audio content.

The executable operations comprise obtaining information indicative of audio rendering capabilities of said audio rendering system, obtaining audio characteristics of said audio content, selecting a subset of said audio characteristics based on said audio rendering capabilities of said audio rendering system, determining light effects based on said subset of said audio characteristics, and controlling said one or more lighting devices to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
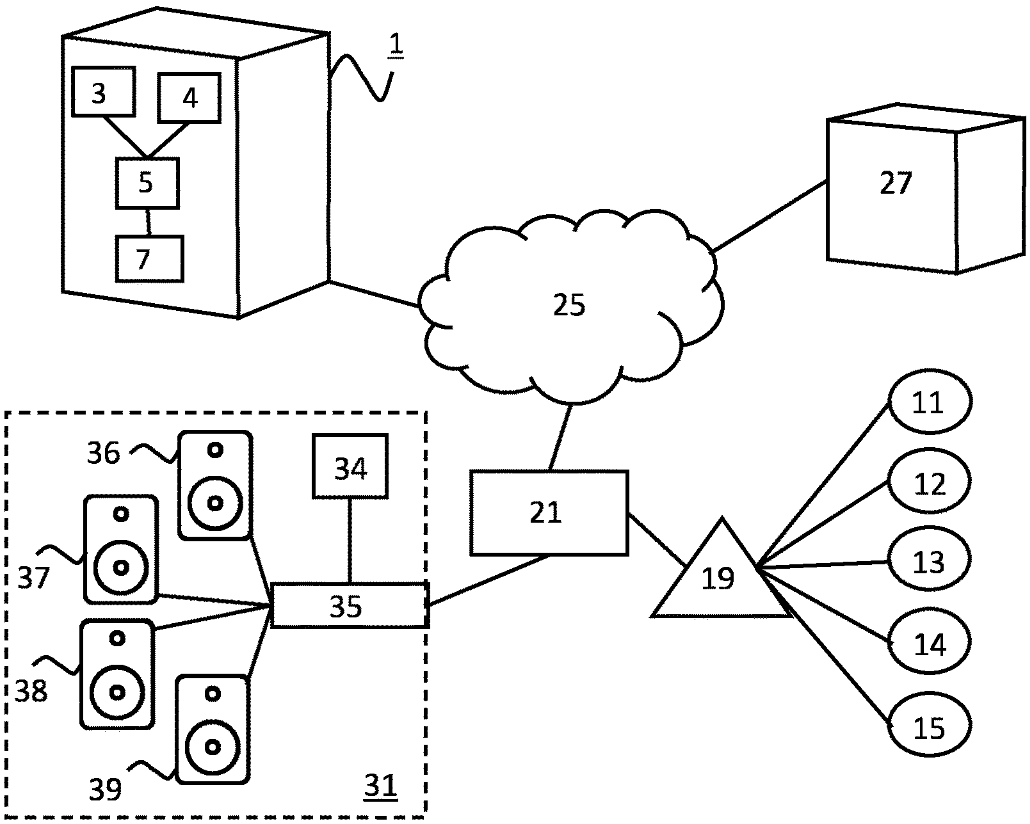
FIG. 1 is a block diagram of a first embodiment of the system.

FIG. 1 shows a first embodiment of the system for controlling one or more lighting devices to render light effects while an audio rendering system 31 renders audio content. In this first embodiment, the system is a computer 1. The computer 1 is connected to the Internet 25 and acts as a server. The computer 1 may be operated by a lighting company, for example. In the example of FIG. 1, the audio rendering system 31 comprises an A/V receiver 35 and five speakers 34,36-39. Speakers 36-39 are regular speakers. Speaker 34 is a subwoofer. A music streaming service 27 is also connected to the Internet 25.

In the embodiment of FIG. 1, the computer 1 is able to control the lighting devices 11-15 via a wireless LAN access point 21 and a bridge 19. The wireless LAN access point 21 is also connected to the Internet 25. The bridge 19 may be a Hue bridge, for example. The bridge 19 communicates with lighting devices 11-15, e.g., using Zigbee technology. The bridge 19 is connected to the wireless LAN access point 21, e.g., via Wi-Fi or Ethernet.

The computer 1 comprises a receiver 3, a transmitter 4, a processor 5, and storage means 7. The processor 5 is configured to obtain, via the receiver 3, information indicative of audio rendering capabilities of the audio rendering system 31, obtain audio characteristics of the audio content, select a subset of the audio characteristics based on the audio rendering capabilities of the audio rendering system 31, determine light effects based on the subset of the audio characteristics, and control, via the transmitter 4, the lighting devices 11-15 to render the light effects. The processor 5 may be configured to receive the audio characteristics from the music streaming service 27 and/or to obtain the audio characteristics by analyzing the audio content itself, for example.

In the embodiment of FIG. 1, the processor 5 is configured to create a light script on the fly in the cloud and then stream it to the bridge 19. The light script may be created based on the following inputs: (1) audio characteristics, e.g. song audio properties captured as metadata; (2) light setup including number of lights and presence of pixelated light sources; and (3) user set parameters—e.g. color palette and dynamicity level (alternatively both palette and dynamic level could be set automatically).

Furthermore, the audio rendering capabilities of the audio rendering system, and optionally the configuration of the audio rendering system, are used as additional parameters for automatically creating the light script. Capabilities relate to the audio rendering system itself, e.g. the types of speakers used, and configuration relates to equalizer settings, e.g. boosting a specific frequency. Information about the audio rendering system may also be used for calculating expected latency (or to set the latency defined by the user for each audio rendering system).

In the embodiment of the computer 1 shown in FIG. 1, the computer 1 comprises one processor 5. In an alternative embodiment, the computer 1 comprises multiple processors. The processor 5 of the computer 1 may be a general-purpose processor, e.g., from Intel or AMD, or an application-specific processor. The processor 5 of the computer 1 may run a Windows or Unix-based operating system for example. The storage means 7 may comprise one or more memory units. The storage means 7 may comprise one or more hard disks and/or solid-state memory, for example. The storage means 7 may be used to store an operating system, applications and application data, for example.

The receiver 3 and the transmitter 4 may use one or more wired and/or wireless communication technologies such as Ethernet and/or Wi-Fi (IEEE 802.11) to communicate with the Internet 25, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The computer 1 may comprise other components typical for a computer such as a power connector. The invention may be implemented using a computer program running on one or more processors.

In the embodiment of FIG. 1, the computer 1 transmits data to the lighting devices 11-15 via the bridge 19. In an alternative embodiment, the computer 1 transmits data to the lighting devices 11-15 without a bridge.

Figure 2:
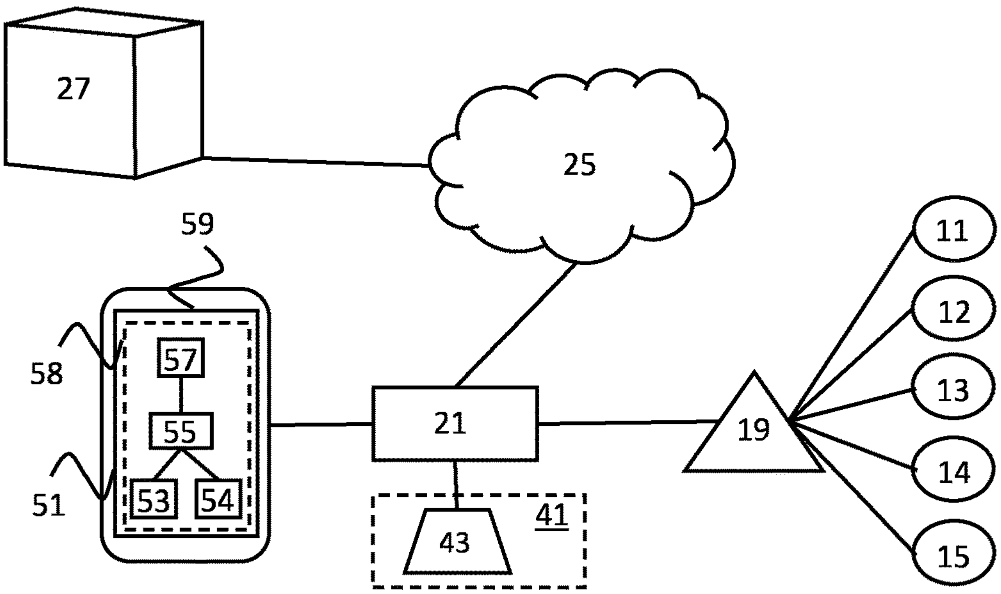
FIG. 2 is a block diagram of a second embodiment of the system.

FIG. 2 shows a second embodiment of the system or controlling one or more lighting devices to render light effects while an audio rendering system 41 renders audio content. In this second embodiment, the system is a mobile device 51. The mobile device 51 may be a smart phone or a tablet, for example. The lighting devices 11-15 can be controlled by the mobile device 51 via the bridge 19. The mobile device 51 is connected to the wireless LAN access point 21, e.g., via Wi-Fi. In the example of FIG. 2, the audio rendering system 41 comprises a smart speaker 43, e.g. an Amazon Echo or a Google Home device.

The mobile device 51 comprises a receiver 53 a transmitter 54, a processor 55, a memory 57, and a touchscreen display 59. The processor 55 is configured to obtain, e.g. via the receiver 53 or the touchscreen display 59, information indicative of audio rendering capabilities of the audio rendering system 41, obtain audio characteristics of the audio content, select a subset of the audio characteristics based on the audio rendering capabilities of the audio rendering system 41, determine light effects based on the subset of the audio characteristics, and control, via the transmitter 54, the lighting devices 11-15 to render the light effects. The processor 55 may be configured to receive the audio characteristics from the music streaming service 27 and/or to obtain the audio characteristics by analyzing the audio content itself, for example.

In the embodiment of the mobile device 51 shown in FIG. 2, the mobile device 51 comprises one processor 55. In an alternative embodiment, the mobile device 51 comprises multiple processors. The processor 55 of the mobile device 51 may be a general-purpose processor, e.g., from ARM or Qualcomm or an application-specific processor. The processor 55 of the mobile device 51 may run an Android or iOS operating system for example. The display 59 may comprise an LCD or OLED display panel, for example. The memory 57 may comprise one or more memory units. The memory 57 may comprise solid state memory, for example.

The receiver 53 and the transmitter 54 may use one or more wireless communication technologies such as Wi-Fi (IEEE 802.11) to communicate with the wireless LAN access point 21, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 53 and the transmitter 54 are combined into a transceiver. The mobile device 51 may further comprise a camera (not shown). This camera may comprise a CMOS or CCD sensor, for example. The mobile device 51 may comprise other components typical for a mobile device such as a battery and a power connector. The invention may be implemented using a computer program running on one or more processors.

In the embodiment of FIG. 2, lighting devices 11-15 are controlled via the bridge 19. In an alternative embodiment, one or more of lighting devices 11-15 are controlled without a bridge, e.g., directly via Bluetooth. Mobile device 51 may be connected to the Internet 25 via a mobile communication network, e.g., 5G, instead of via the wireless LAN access point 21.

Figure 3:
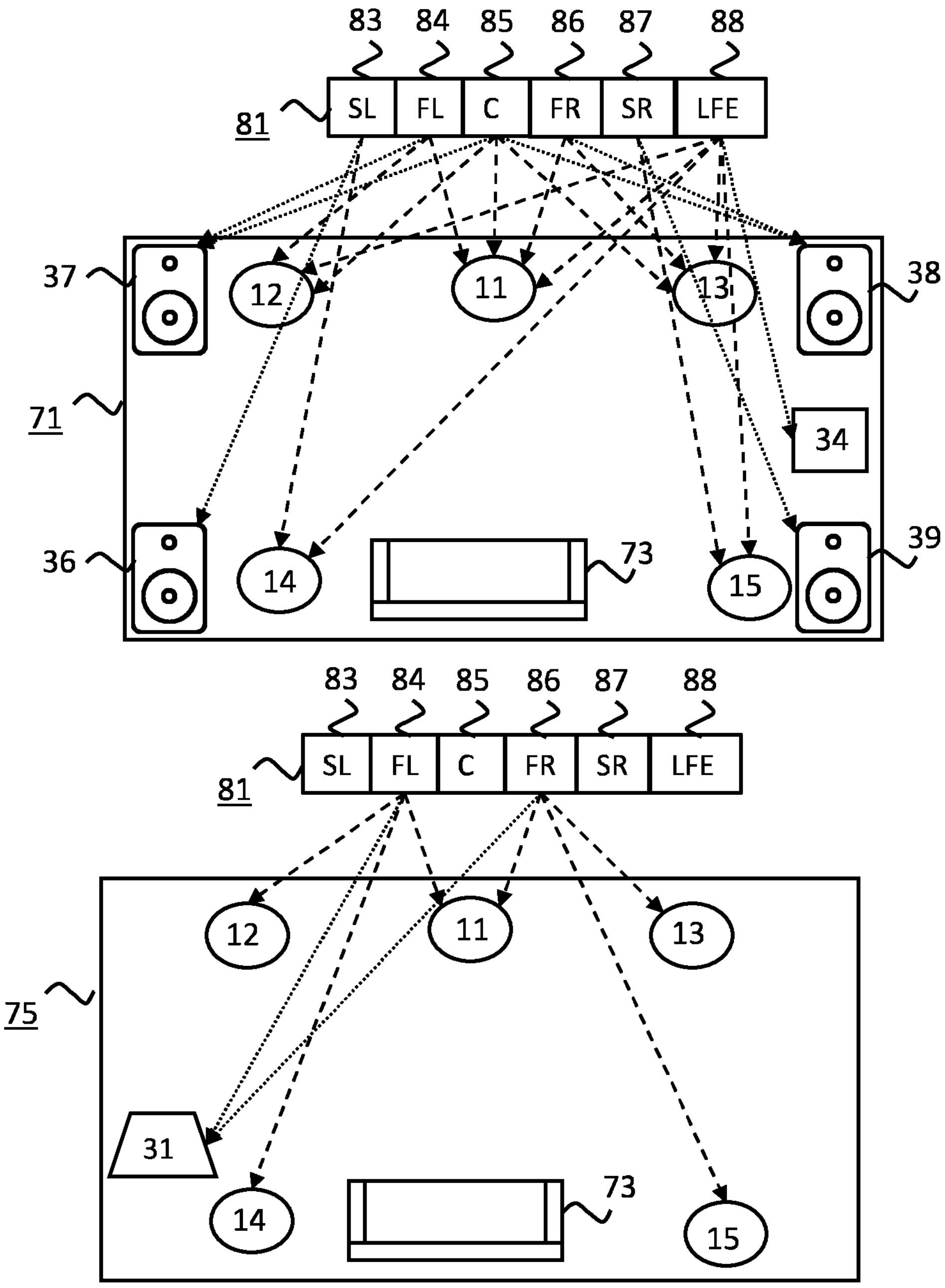
FIG. 3 shows examples of a room in which five entertainment lights and different audio rendering systems have been installed.

FIG. 3 shows two examples of a room in which five entertainment lighting devices 11-15 have been installed. Lighting devices 11-13 have been installed at the front of the room. Lighting devices 14-15 have been installed at the rear of the room. In these examples, audio content 81 comprises six audio channels (5.1 audio channels to be precise): a surround left channel 83, a front left channel 84, a center channel 86, a front right channel 86, a surround right channel 87, and a low frequency effects (LFE) channel 88. In an alternative example, the audio content 81 may comprise more or less than six audio channels and/or may comprise audio objects (e.g. when the audio content is in Dolby Atmos or DTS:X format).

In a room 71, an A/V receiver (not shown) and five speakers 34,36-39 have been installed. Speakers 37-38 have been installed at the front of the room. Speakers 36 and 39 have been installed at the rear of the room, on opposite sides of a couch 73, which is facing the front of the room. Speakers 36-39 are regular speakers. Speaker 34 is a subwoofer.

In this audio setup, the front left channel 84 is reproduced by the front left speaker 37, the front right channel 86 is reproduced by the front right speaker 38, the surround left channel 83 is reproduced by the rear left speaker 36, and the surround right channel 87 is reproduced by the rear right speaker 39. Speakers 36-39 are capable of reproducing all frequencies present in the audio channels 83-87. In this example, no center speaker is present and the center channel 85 is therefore reproduced by both the front left speaker 37 and the front right speaker 38. Alternatively, a center speaker might be present and the center channel 85 would then be reproduced by this center speaker.

The LFE channel 88 is reproduced by the subwoofer 34. In the example of FIG. 3, the subwoofer 34 only reproduces the LFE channel 88. Alternatively, the subwoofer 34 may be used to reproduce low frequencies of the other audio channels.

With regard to the light effects, the front left lighting device 12 is used to render light effects determined based on audio characteristics of the front left channel 84 and the LFE channel 88, the front right lighting device 13 is used to render light effects determined based on audio characteristics of the front right channel 86 and the LFE channel 88, the rear left lighting device 14 is used to render light effects determined based on audio characteristics of the surround left channel 83 and the LFE channel 88, and the rear right lighting device 15 is used to render light effects determined based on audio characteristics of the surround right channel 87 and the LFE channel 88.

In the example of FIG. 3, the front center lighting device 11 renders light effects determined based on audio characteristics of the front left channel 84, the center channel 85, the front right channel 86, and the LFE channel 88. This ensures that the rendered light best matches the reproduced audio, as there is no (center) speaker that only reproduces the center channel 85. Alternatively, the front center lighting device 11 may render light effects which are determined based on audio characteristics of (only) the center channel 85 and the LFE channel 88, for example.

In a room 75, a single speaker 31 has been installed, e.g. a smart speaker. This speaker 31 reproduces the front left channel 84 and the front right channel 86 but it does not reproduce the other audio channels of the audio content 81, even if the audio content 81 is music. Furthermore, the speaker 31 is not capable of reproducing the lowest frequencies of the front channels 84 and 86.

With regard to the light effects, the front left lighting device 12 is used to render light effects determined based on audio characteristics of the front left channel 84, the front right lighting device 13 is used to render light effects determined based on audio characteristics of the front right channel 86, the rear left lighting device 14 is used to render light effects determined based on audio characteristics of the front left channel 84, and the rear right lighting device 15 is used to render light effects determined based on audio characteristics of the front right channel 86.

Thus, in the example of FIG. 3, no light effects are determined based on audio characteristics in audio channels 83, 85, 87, and 88 when the speaker 31 is used to reproduce the audio content 81. This ensures that the rendered light best matches the reproduced audio. In the example of FIG. 3, the light effects are determined based on audio characteristics in the frequency bands that can be reproduced by the speakers. When the speaker 31 is used to reproduce the audio content 81, no light effects are determined based on audio characteristics of the lowest frequencies of the front channels 84 and 86. This ensures that the rendered light best matches the reproduced audio.

In the example of FIG. 3, when the speaker 31 is used to reproduce the audio content 81, three groups of lighting devices are formed which render the same light effects: a first group comprising lighting devices 12 and 14, a second group comprising lighting devices 13 and 15, and a third group comprising lighting device 11. Alternatively, a different number of groups may be formed and/or the groups may be formed based on different grouping criteria.

For example, groups of lighting devices may be formed based on their distance to the speaker 31. In this case, a first group could comprise lighting device 14, a second group could comprise lighting devices 12 and 15, and a third group could comprise lighting devices 13 and 15. Specific light effects may be mapped to groups of lighting devices in a different manner than described above.

In the example of FIG. 3, the position of the user is assumed to be fixed, i.e. on couch 73 facing lighting device 11. If the audio rendering system comprises a headphone, the position of the user may be assumed not to be fixed. In this case, the assignment of effects on lamps or group of lamps may be based on the lamps' relative position and distance to each other only and not on the position of the user. For example, the front left lighting device 12 of FIG. 3 may always be used to render light effects determined based on audio characteristics of the front left channel 84 and the front right lighting device 13 may always be used to render light effects determined based on audio characteristics of the front right channel 86, even if the user wearing the headphones is standing near lighting device 11 facing the couch 73. If the headphones are not be able to render audio from the LFE audio channel, light effects are not determined based on audio characteristics in the LFE audio channel.

Figure 4:
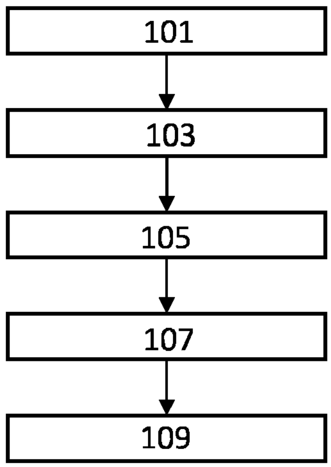
FIG. 4 is a flow diagram of a first embodiment of the method.

A first embodiment of the method of controlling one or more lighting devices to render light effects while an audio rendering system renders audio content is shown in FIG. 4. The method may be performed by the (cloud) computer 1 of FIG. 1 or the mobile device 51 of FIG. 2, for example.

A step 101 comprises obtaining information indicative of audio rendering capabilities of the audio rendering system. Information indicative of the audio rendering capabilities of a new audio rendering system may be obtained when the new audio rendering system is added to the home network and this information may then be stored on storage means, for example. This information may be obtained from the audio rendering device, e.g. via DLNA/UPnP, or from a user via a user input device, for example. Alternatively, this information may be obtained when the function/mode is activated which causes the light effects to be rendered while the audio rendering system renders audio content.

If the information is stored, it needs to be obtained from the storage means when the above-mentioned function/mode is activated. In this case, to identify which audio rendering system is being used and retrieve the correct information, an identifier of the audio rendering system may be obtained. For example, the name of the device which is often accessible through a player API (e.g. of Spotify) may be enough to identify the audio rendering system and may even be enough determine a type of the audio rendering system (e.g. the Spotify API could report that music is playing on an Alexa device).

A step 103 comprises obtaining audio characteristics of the audio content. Some or all of the audio characteristics may be determined by locally analyzing the audio content, for example. Some or all of the audio characteristics may be received from a music streaming service, for example. If the audio characteristics are obtained from a music streaming service, first, initial information may be obtained which only contains the basic information about the song being played, and song (album) art to display on the UI. The audio characteristics may then be requested at the later stage when system is in light streaming mode.

The initial information may be pushed by the music streaming service or pulled from the music streaming service. As a first example, a music streaming service may inform a lighting system every time music starts streaming. This may be beneficial when a user wants to render light effects every time he or she listens to music (on a specific device). Moreover, in this situation, the lighting control app could also display that music is playing to indicate to the user that light effects could also be enabled. As a second example, the lighting system may pull this information from the audio streaming service when the user opens the lighting control app and/or selects/enables light effects.

A step 105 comprises selecting a subset of the audio characteristics obtained in step 103 based on the audio rendering capabilities of the audio rendering system, as indicated in the information obtained in step 101. For example, if the audio rendering system has a subwoofer and a certain section of the audio characteristics relates to the low frequencies (e.g. data related to drums), then all audio characteristics of this certain section are selected. If the audio rendering system does not have a subwoofer, then none, or just a part, of the audio characteristics of this certain section is selected. If the certain section of the audio characteristics relates to a violin solo, then it does not matter whether the audio rendering system has a subwoofer, i.e. all audio characteristics of this certain section are selected.

A step 107 comprises determining light effects based on the subset of the audio characteristics determined in step 105. Step 107 may comprise creating a light script in real-time during the audio playback. A step 109 comprises controlling the one or more lighting devices to render the light effects. For example, a light script created in step 107 may be sent to the local light control system (e.g., Hue bridge).

Figure 5:
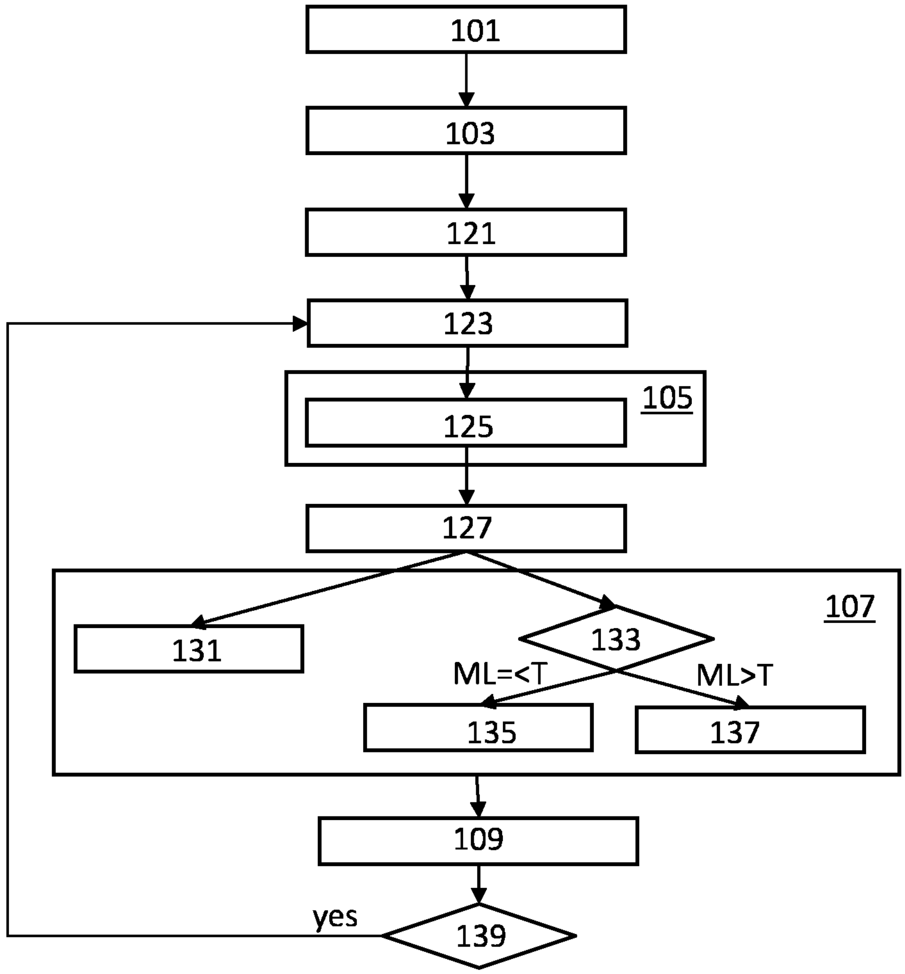
FIG. 5 is a flow diagram of a second embodiment of the method.

A second embodiment of the method of controlling one or more lighting devices to render light effects while an audio rendering system renders audio content is shown in FIG. 5. The method may be performed by the (cloud) computer 1 of FIG. 1 or the mobile device 51 of FIG. 2, for example.

Step 101 comprises obtaining information indicative of audio rendering capabilities of the audio rendering system. Step 103 comprises obtaining audio characteristics of the audio content. Step 121 comprises determining events in the audio content. The events correspond to moments in the audio content when the audio characteristics meet predefined requirements.

These audio events are the moments in the audio content for which it is beneficial to render an accompanying light effect. The predefined requirements express when it is beneficial to render an accompanying light effect. The predefined requirements may require that the audio intensity/loudness exceeds a certain threshold, for example. In this case, the determined audio events are the moments at which the audio intensity/loudness exceeds the threshold. These audio events may be determined based on data points received from a music streaming service or by analyzing the audio content, for example.

For instance, Spotify provides metadata per segment. Spotify segments have a variable length, e.g. 15 milliseconds, 20 milliseconds, or 100 milliseconds. Spotify's metadata indicates a starting loudness and a maximum loudness, amongst others. An event may be determined, for example. when the maximum loudness exceeds a threshold and/or when the difference between the maximum loudness and a starting loudness (of the current segment or the next segment) exceeds a threshold.

A step 123 comprises selecting one of the events determined in step 121. In the first iteration of step 123, a first event is selected. In each next iteration of step 123, a next event is selected. Step 105 comprises selecting a subset of the audio characteristics obtained in step 103 based on the audio rendering capabilities of the audio rendering system, as indicated in the information obtained in step 101. In the embodiment of FIG. 5, step 105 is implemented by a step 125. Step 125 comprises selecting one or more audio characteristics relating to the event selected in step 123 based on the audio rendering capabilities of the audio rendering system.

Next, a step 127 comprises determining a matching level ML between the audio rendering capabilities and the one or more audio characteristics selected in step 125. In an implementation, the matching level ML may be calculated, for example, by dividing, with respect to the selected one or more audio characteristics, an audio intensity/loudness in the frequency bands supported by the audio rendering system by the audio intensity/loudness in all frequency bands.

Step 107 comprises determining one or more light effects for the event selected in step 123 based on the subset of the audio characteristics determined in step 105. In the embodiment of FIG. 5, step 107 comprises steps 131, 133, 135, and 137. Step 131 comprises determining a brightness, i.e. a light output level/dim level, for the one or more light effects. Steps 135 and 137 comprise determining a color for the one or more light effects.

Step 133 comprises determining whether the matching level ML exceeds a threshold T. Step 137 is performed if it is determined in step 133 that the matching level ML exceeds the threshold T. Step 137 comprises selecting a contrasting light effect, e.g. a bright white light effect, as the light effect. Step 135 is performed if it is determined in step 133 that the matching level ML does not exceed the threshold T. Step 135 comprises selecting a color in the default manner, e.g. by selecting a color randomly from a user-defined color palette or by determining a color based on the one or more audio characteristics, e.g. based on the genre of the audio content.

In the embodiment of FIG. 5, the intensity of the light effects is determined based on the matching level ML determined in step 127. Specifically, in step 131, the brightness of the one or more light effects is determined based on the matching level ML. In this embodiment or in an alternative embodiment, contrast and/or color saturation may be determined based on the matching level ML. A desired contrast in brightness may be realized in step 131 and a desired contrast in color and/or a desired color saturation may be realized in step 135. In an alternative embodiment, the dynamicity level of the light effects, e.g. the number of audio events for which light effects are rendered, is also based on a match between the audio rendering capabilities and the subset of the audio characteristics.

Step 109 comprises controlling the one or more lighting devices to render the light effects determined in step 107. In the embodiment of FIG. 5, the events are determined based on the original set of audio characteristics. In an alternative embodiment, the audio events are determined based on a subset of the audio characteristics which has been selected based on the audio rendering capabilities of the audio rendering system (see e.g. FIG. 7).

In the embodiment of FIG. 5, audio events are determined based on all audio characteristics and as a result, audio events may be determined that would not be determined based on only the subset of audio characteristics, i.e. audio events that do not (just) occur in the subset of audio characteristics. Light effects with a lower intensity may be rendered for these audio events. For example, a lower brightness may be determined in step 131 if the matching level ML is low.

Figure 6:
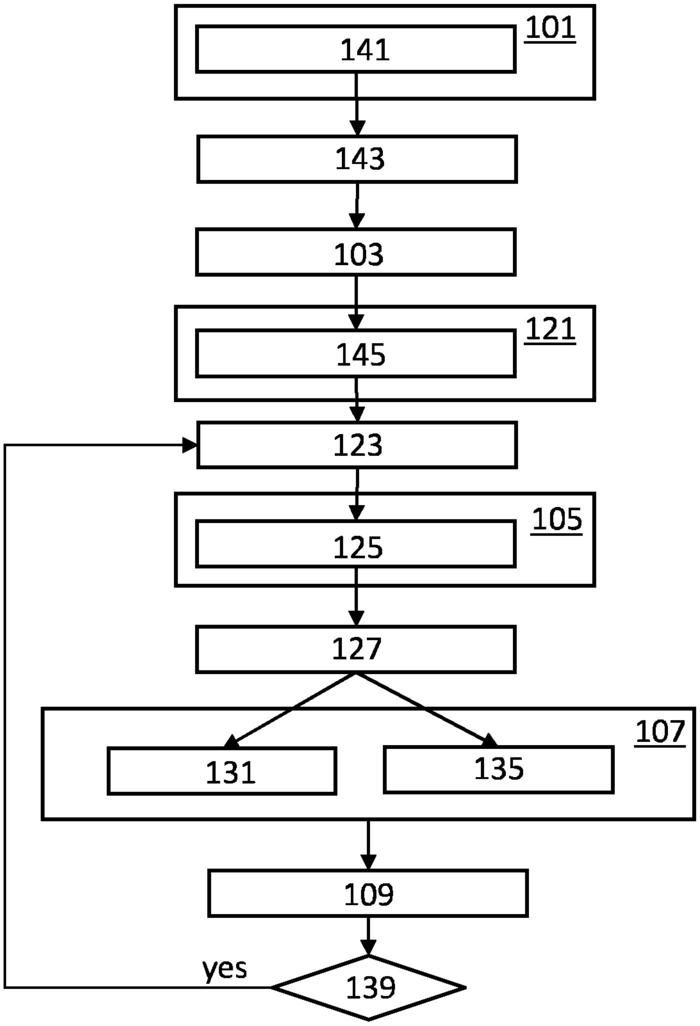
FIG. 6 is a flow diagram of a third embodiment of the method.

A third embodiment of the method of controlling one or more lighting devices to render light effects while an audio rendering system renders audio content is shown in FIG. 6. The embodiment of FIG. 6 is a variant on the embodiment of FIG. 5. In the embodiment of FIG. 6, step 101 of FIG. 5 is implemented by a step 141, a step 143 is performed between steps 101 and 103, and step 121 of FIG. 5 is implemented by a step 145.

In step 141, the obtained information is indicative of audio rendering capabilities which comprise a capability of reproducing different frequencies. Step 143 comprises selecting one or more key frequencies based on the capability of reproducing different frequencies, as indicated in the information obtained in step 141. Step 103 comprises obtaining audio characteristics of the audio content. Step 145 comprises determining, based on the audio characteristics obtained in step 103, events in the audio content which are associated with a key frequency of the one or more key frequencies selected in step 143.

For example, data points received from a music streaming service may comprise both an audio intensity/loudness and a key frequency per data point. A data point may be determined to correspond to an audio event if the associated key frequency can be reproduced and the audio intensity/loudness exceeds a threshold, for example.

Next, steps 123, 125, and 127 are performed as described in relation to FIG. 5. Step 107 is performed after step 127. In the embodiment of FIG. 6, step 107 comprises steps 131 and 135 of the embodiment of FIG. 5. However, in the embodiment of FIG. 6, no contrasting light effect is selected as the light effect if it is determined that the matching level exceeds a threshold. In an alternative embodiment, step 107 of the embodiment of FIG. 6 is replaced with step 107 of the embodiment of FIG. 5. Step 109 is performed after step 107 as described in relation to FIG. 5.

Figure 7:
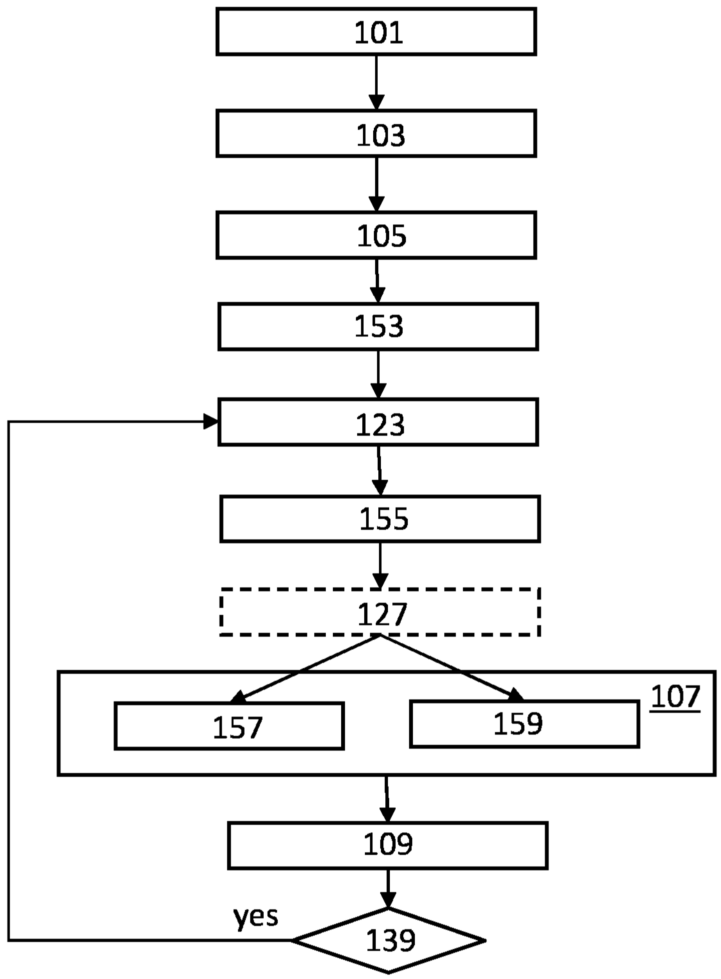
FIG. 7 is a flow diagram of a fourth embodiment of the method.

A fourth embodiment of the method of controlling one or more lighting devices to render light effects while an audio rendering system renders audio content is shown in FIG. 7. The method may be performed by the (cloud) computer 1 of FIG. 1 or the mobile device 51 of FIG. 2, for example.

Step 101 comprises obtaining information indicative of audio rendering capabilities of the audio rendering system. Step 103 comprises obtaining audio characteristics of the audio content. Step 105 comprises selecting a subset of the audio characteristics obtained in step 103 based on the audio rendering capabilities of the audio rendering system, as indicated in the information obtained in step 101.

Step 153 comprises determining events in the audio content based on the audio rendering capabilities by determining events based on the subset of audio characteristics selected in step 105. The events correspond to moments in the audio content when the subset of audio characteristics meet predefined requirements. For example, if an audio rendering system is not capable of reproducing a Low Frequency Effects (LFE) channel or the frequencies of this LFE channel, audio events, e.g. corresponding to explosions, in the LFE channel may be disregarded, and light effects would then not be rendered to accompany those events. Step 153 may be similar to step 145 of FIG. 6. In that case, the subset of audio characteristics may comprise the data points associated with a key frequency of one or more selected key frequencies.

Step 123 comprises selecting one of the events determined in step 153. In the first iteration of step 123, a first event is selected. In each next iteration of step 123, a next event is selected. A step 155 comprises selecting one or more audio characteristics relating to the event selected in step 123 from the subset of audio characteristics selected in step 105. Next, step 127 is optionally performed. Step 127 comprises determining a matching level between the audio rendering capabilities and the one or more audio characteristics selected in step 155.

Step 107 comprises determining one or more light effects for the event selected in step 123. Since the events have been determined in step 153 based on the subset of audio characteristics selected in step 105, the one or more light effects are thus determined based on the subset of audio characteristics determined in step 105. In step 107, the intensity, e.g. the brightness, contrast, color saturation and/or dynamicity level, of the light effects may be determined based on the subset of audio characteristics, e.g. based on the matching level optionally determined in step 127. Alternatively, the one or more components of the intensity of the light effects may be fixed and/or depend on audio characteristics not in the subset.

In the embodiment of FIG. 7, step 107 comprises steps 157 and 159. Step 157 comprises determining a brightness, i.e. light output level, for the one or more light effects. The brightness may be a fixed brightness or may be determined based on the matching level optionally determined in step 127, for example. Step 159 comprises determining a color for the one or more light effects, e.g. by selecting a color randomly from a user-defined color palette or by determining a color based on the one or more audio characteristics. Step 109 comprises controlling the one or more lighting devices to render the light effects determined in step 107.

Figure 8:
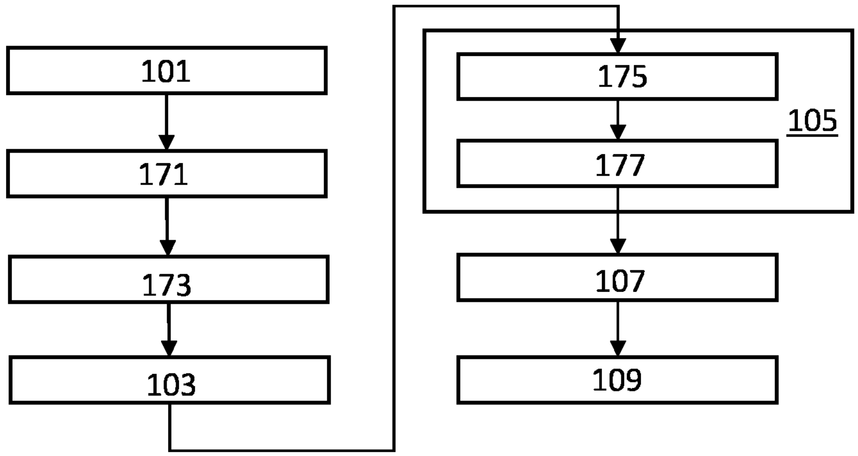
FIG. 8 is a flow diagram of a fifth embodiment of the method.

A fifth embodiment of the method of controlling one or more lighting devices to render light effects while an audio rendering system renders audio content is shown in FIG. 8. The method may be performed by the (cloud) computer 1 of FIG. 1 or the mobile device 51 of FIG. 2, for example.

Step 101 comprises obtaining information indicative of audio rendering capabilities of the audio rendering system. A step 171 comprises determining a type of the audio rendering system and/or one or more types of one or more audio rendering devices comprised in the audio rendering system based on the information obtained in step 101. A step 173 comprises determining the audio rendering capabilities based on the type of the audio rendering system and/or the one or more types of the one or more audio rendering devices, as determined in step 171.

In the embodiment of FIG. 8, these audio rendering capabilities comprise at least a capability of reproducing different frequencies. For example, if the audio rendering system comprises only a smart speaker like an Amazon Echo speaker, it may be determined that only a relatively small number of audio channels can be rendered and/or that very low frequencies cannot be reproduced. If the audio rendering system comprises an AV receiver and at least six (5.1) speakers, it may be determined that a relatively large number of audio channels can be rendered and/or that very low frequencies can be reproduced.

Step 103 comprises obtaining audio characteristics of the audio content. Step 105 comprises selecting a subset of the audio characteristics obtained in step 103 based on the audio rendering capabilities of the audio rendering system determined in step 173. In the embodiment of FIG. 8, step 105 is implemented by steps 175 and 177. Step 175 comprises selecting one or more frequency bands based on the capability of reproducing different frequencies determined in step 173. Step 177 comprises selecting the subset of the audio characteristics based on the one or more frequency bands of the audio content selected in step 175. For example, Fourier frequency analysis may be used to determine at which moments the power in the frequency bands that the audio rendering system is able to reproduce exceeds a threshold.

Step 107 comprises determining light effects based on the subset of the audio characteristics determined in step 105. Step 109 comprises controlling the one or more lighting devices to render the light effects.

Figure 9:
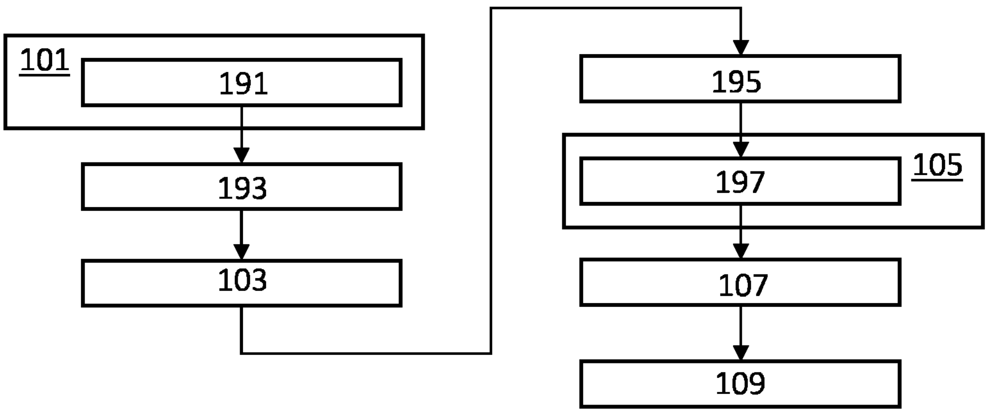
FIG. 9 is a flow diagram of a sixth embodiment of the method.

A sixth embodiment of the method of controlling one or more lighting devices to render light effects while an audio rendering system renders audio content is shown in FIG. 9. The method may be performed by the (cloud) computer 1 of FIG. 1 or the mobile device 51 of FIG. 2, for example.

Step 101 comprises obtaining information indicative of audio rendering capabilities of the audio rendering system. In the embodiment of FIG. 9, step 101 is implemented by a step 191. In step 191, the obtained information is indicative of audio rendering capabilities which comprise a capability of reproducing surround sound and/or are indicative of a number of audio channels.

A step 193 comprises selecting one or more audio source positions based on the capability of reproducing surround sound and/or the number of audio channels, as indicated in the information obtained in step 191. For example, spatial areas of a room where audio may be made to appear to originate from may be selected in step 193. Step 103 comprises obtaining audio characteristics of the audio content. A step 195 comprises selecting one or more audio channels and/or audio objects of the audio content based on the one or more audio source positions selected in step 193.

Step 105 comprises selecting a subset of the audio characteristics obtained in step 103 based on the audio rendering capabilities of the audio rendering system. In the embodiment of FIG. 9, step 105 is implemented by a step 197. Step 197 comprises selecting the subset of the audio characteristics based on the one or more audio channels and/or audio objects selected in step 195.

Step 107 comprises determining light effects based on the subset of the audio characteristics determined in step 105. Step 109 comprises controlling the one or more lighting devices to render the light effects. For example, if the audio rendering system does not comprise surround speakers or other rear speakers and is not able to make the audio appear to come from the rear using a virtualization technique, audio characteristics from surround channels or other rear channels and/or from audio objects with a rear position that are not rendered on any other speaker may be disregarded.

The embodiments of FIGS. 4 to 9 differ from each other in multiple aspects, i.e., multiple steps have been added or replaced. In variations on these embodiments, only a subset of these steps is added or replaced and/or one or more steps is omitted. For example, steps 133 and 137 may be omitted from the embodiment of FIG. 5 and/or added to the embodiment of FIG. 6 and/or the embodiment of FIG. 7. One or more of the embodiments of FIGS. 4 to 9 may be combined. For example, the embodiments of FIGS. 8 and 9 may be combined with each other and/or with the embodiment of FIG. 5, FIG. 6, or FIG. 7.

Figure 10:
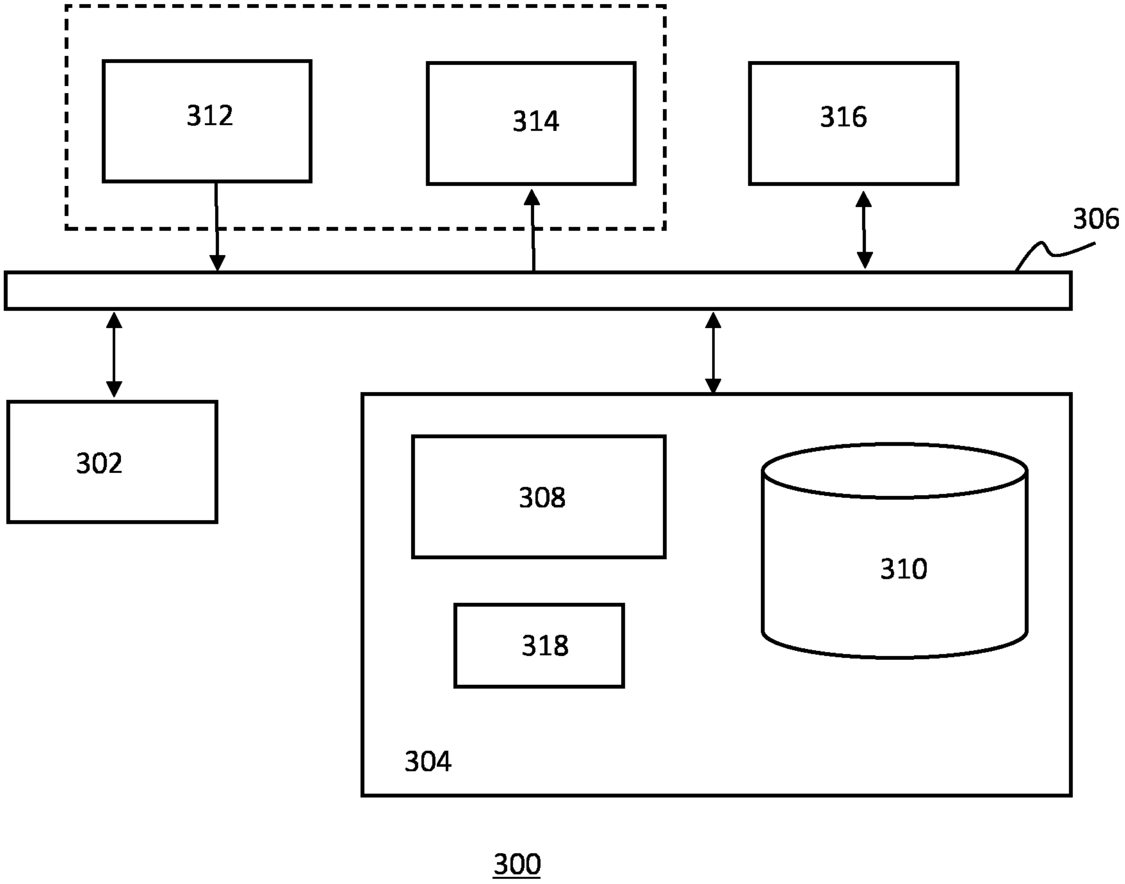
FIG. 10 is a block diagram of an exemplary data processing system for performing the method of the invention.

FIG. 10 depicts a block diagram illustrating an exemplary data processing system that may perform the method as described with reference to FIGS. 4 to 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g., if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling one or more lighting devices to render light effects while an audio rendering system renders audio content, said system comprising:
- at least one input interface;
- at least one transmitter; and
- at least one processor configured to:
  - obtain, via said at least one input interface, information indicative of a type of said audio rendering system and/or of one or more types of one or more audio rendering devices comprised in said audio rendering system
  - determine audio rendering capabilities of said audio rendering system, based on said information indicative of said type of said audio rendering system and/or based on said information indicative of said one or more types of said one or more audio rendering devices,
  - obtain audio characteristics of said audio content,
  - select one or more subsets of said audio characteristics based on said audio rendering capabilities of said audio rendering system,
  - determine light effects based on said one or more subsets of said audio characteristics, and
  - control, via said at least one transmitter, said one or more lighting devices to render said light effects.

2. A system as claimed in claim 1, wherein said at least one processor is configured to:

determine events in said audio content, said events corresponding to moments in said audio content when said audio characteristics meet predefined requirements, and determine a light effect for each respective event of said events by determining an intensity of said light effect based on a match between said audio rendering capabilities and said one or more subsets of said audio characteristics, said one or more subsets of said audio characteristics relating to said respective event.

3. A system as claimed in claim 2, wherein said at least one processor is configured to determine said events based on said one or more subsets of said audio characteristics.

4. A system as claimed in claim 2, wherein said intensity comprises at least one of brightness, contrast, color saturation and dynamicity level.

5. A system as claimed in claim 2, wherein said at least one processor is configured to determine a matching level between said audio rendering capabilities and said one or more subsets of said audio characteristics, determine whether said matching level exceeds a threshold, and select a contrasting light effect as said light effect if said matching level is determined to exceed said threshold.

6. A system as claimed in claim 1, wherein said at least one processor is configured to:

determine events in said audio content based on said audio rendering capabilities, said events corresponding to moments in said audio content when said one or more subsets of said audio characteristics meet predefined requirements, and determine said light effects for said events, based on said one or more subsets of said audio characteristics.

7. A system as claimed in claim 6, wherein said at least one processor is configured to determine an intensity of said light effects based on said one or more subsets of said audio characteristics.

8. A system as claimed in claim 1, wherein said audio rendering capabilities comprise a capability of reproducing different frequencies.

9. A system as claimed in claim 8, wherein said at least one processor is configured to select one or more frequency bands of said audio content based on said capability of reproducing different frequencies and select said one or more subsets of said audio characteristics based on said selected one or more frequency bands of said audio content.

10. A system as claimed in claim 8, wherein said at least one processor is configured to select one or more key frequencies based on said capability of reproducing different frequencies, determine events in said audio content which are associated with a key frequency of said one or more key frequencies, and select said one or more subsets of said audio characteristics by selecting audio characteristics associated with said events.

11. A system as claimed in claim 1, wherein said audio rendering capabilities comprise a capability of reproducing surround sound and/or are indicative of a number of audio channels.

12. A system as claimed in claim 11, wherein said at least one processor is configured to select one or more audio source positions based on said capability of reproducing surround sound and/or said number of audio channels, select one or more audio channels and/or audio objects of said audio content based on said one or more audio source positions, and select said one or more subsets of said audio characteristics based on said selected one or more audio channels and/or audio objects.

13. A system as claimed in claim 1, wherein said at least one processor is configured to obtain said audio characteristics by receiving said audio characteristics from a music streaming service and/or by analyzing said audio content.

14. A system as claimed in claim 1, wherein said at least one processor is configured to obtain an identifier of said audio rendering system and to determine said type of said audio rendering system based on said identifier.

15. A system as claimed in claim 1, wherein said at least one processor is further configured to:

obtain a configuration of said audio rendering system, said configuration comprising equalizer settings, and select said one or more subsets of said audio characteristics further based on said configuration.

16. A system as claimed in claim 1, wherein said at least one processor is configured to determine said light effects by creating a light script during rendering of said audio content, and to control said one or more lighting devices by transmitting said light script to a light control system.

17. A method of controlling one or more lighting devices to render light effects while an audio rendering system renders audio content, said method comprising:

obtaining information indicative of a type of said audio rendering system and/or of one or more types of one or more audio rendering devices comprised in said audio rendering system;

determining audio rendering capabilities of said audio rendering system, based on said type of said audio rendering system and/or based on said one or more types of said one or more audio rendering devices;

obtaining audio characteristics of said audio content;

selecting a subset of said audio characteristics based on said audio rendering capabilities of said audio rendering system;

determining light effects based on said subset of said audio characteristics; and controlling said one or more lighting devices to render said light effects.

18. A non-transitory computer-readable medium storing computer program code to perform the method of claim 17 when run on a processor.

* * * * *